US012792616B2

(12) United States Patent
Behal et al.

(10) Patent No.: US 12,792,616 B2
(45) **Date of Patent: *Nov. 10, 2026**

(54) CONTEXTUALIZING KNOWLEDGE PANELS

(71) Applicant: Google LLC, Mountain View, CA (US)

(72) Inventors: Amit Behal, San Jose, CA (US); Randolph G. Brown, Sunnyside, NY (US); Akash Nanavati, Mountain View, CA (US); Bharat Kalyanpur, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,292

(22) Filed: Dec. 26, 2024

(65) Prior Publication Data

US 2025/0231951 A1 Jul. 17, 2025

Related U.S. Application Data

(63) Continuation of application No. 18/339,737, filed on Jun. 22, 2023, now Pat. No. 12,182,142, which is a (Continued)

(51) Int. Cl.
*G06F 16/00* (2019.01)
*G06F 16/2452* (2019.01)
(Continued)

(52) U.S. Cl.
CPC .. *G06F 16/24578* (2019.01); *G06F 16/24522* (2019.01); *G06F 16/24575* (2019.01); *G06F 16/951* (2019.01); *G06F 16/953* (2019.01)

(58) Field of Classification Search
CPC ............ G06F 16/24578; G06F 16/953; G06F 16/24522; G06F 16/24575; G06F 16/951
(Continued)

(56) References Cited

U.S. PATENT DOCUMENTS 7,743,045 B2 * 6/2010 Guha .................... G06F 16/951 707/706
8,990,208 B2 * 3/2015 Wang .................... G06Q 10/10 707/732

(Continued)

*Primary Examiner* — Monica M Pyo
(74) *Attorney, Agent, or Firm* — BRAKE HUGHES BELLERMANN LLP

(57) ABSTRACT

Methods, systems, and apparatus for generating user interface elements for an entity in response to a search query. The method includes receiving a request that includes the entity and one or more context terms. In response to determining to provide the search results page including knowledge elements, the method identifies knowledge elements for the entity that include facts relating to the entity and identifies content in at least one knowledge element of the knowledge elements for the entity that relates to data identifying the entity and the one or more context terms. The method generates the user interface elements for at least some of the knowledge elements, including generating a user interface element for the knowledge element that includes a change of appearance of the content. The user interface elements are provided in the search results page in response to the request.

19 Claims, 5 Drawing Sheets

Related U.S. Application Data continuation of application No. 17/649,019, filed on Jan. 26, 2022, now Pat. No. 11,720,577, which is a continuation of application No. 16/519,745, filed on Jul. 23, 2019, now abandoned, which is a continuation of application No. 14/970,993, filed on Dec. 16, 2015, now Pat. No. 10,402,410.

(60) Provisional application No. 62/162,160, filed on May 15, 2015.

(51) Int. Cl.
*G06F 16/2457* (2019.01)
*G06F 16/951* (2019.01)
*G06F 16/953* (2019.01)

(58) Field of Classification Search
USPC .......................................................... 707/730
See application file for complete search history.

(56) References Cited

U.S. PATENT DOCUMENTS

| | | | | |
|---|---|---|---|---|
| 9,361,387 | B2 * | 6/2016 | Dumais | G06F 16/9537 |
| 9,436,918 | B2 * | 9/2016 | Pantel | G06F 16/24578 |
| 2013/0311458 | A1 * | 11/2013 | Goel | G06F 16/9535<br>707/723 |
| 2014/0063042 | A1 * | 3/2014 | Hernandez | G06F 8/38<br>345/592 |
| 2015/0100524 | A1 * | 4/2015 | Pantel | G06N 20/00<br>706/12 |
| 2015/0100562 | A1 * | 4/2015 | Kohlmeier | G06N 20/20<br>707/706 |

* cited by examiner

CONTEXTUALIZING KNOWLEDGE PANELS

CROSS-REFERENCE TO RELATED APPLICATIONS

This application is a continuation of, and claims priority to, U.S. patent application Ser. No. 18/339,737, filed on Jun. 22, 2023, entitled "CONTEXTUALIZING KNOWLEDGE PANELS", which is a continuation of U.S. patent application Ser. No. 17/649,019, filed on Jan. 26, 2022, entitled "CONTEXTUALIZING KNOWLEDGE PANELS", now U.S. Pat. No. 11,720,577, which is a continuation of U.S. patent application Ser. No. 16/519,745, filed on Jul. 23, 2019, entitled "CONTEXTUALIZING KNOWLEDGE PANELS", which is a continuation of U.S. patent application Ser. No. 14/970,993, filed on Dec. 16, 2015, entitled "CONTEXTUALIZING KNOWLEDGE PANELS,", now U.S. Pat. No. 10,402,410, which claims the benefit under 35 U.S.C. § 119 (e) of U.S. Patent Application No. 62/162,160, filed on May 15, 2015, entitled "CONTEXTUALIZING KNOWLEDGE PANELS", the disclosures of which are incorporated by reference herein in their entirety.

TECHNICAL FIELD

This specification relates to search engines.

BACKGROUND

In general, a user can request information by inputting a query to a search engine. The search engine can process the query and can provide information for output to the user in response to the query.

SUMMARY

A system can receive requests including identifiers of entities, e.g., singers, actors, musicians, writers, directors, television networks, or other production companies, as well as context terms that are referenced by a search query submitted by a user. In response to receiving a request that identifies an entity and one or more context terms, the system can determine to provide a search results page that includes a knowledge panel relevant to the entity in view of the context terms, and search results relevant to the entity in view of the context terms. A knowledge panel is a user interface element that provides information, e.g., known facts, related to a particular entity referenced by a search query. The system can determine information to include in the knowledge panel by identifying the one or more context terms that are associated with the entity identified by the search query.

Innovative aspects of the subject matter described in this specification may be embodied in methods that include the actions of receiving a request that includes an entity identifier of an entity that is referenced by a search query submitted by a user and one or more context terms that are referenced by the search query; identifying a plurality of knowledge elements that are related to the entity; identifying one or more context terms that are associated with the entity that is referenced by the search query; assigning, by one or more computers, rank scores to the plurality of knowledge elements, based at least on identifying the one or more context terms that are associated with the entity that is referenced by the search query; selecting one or more of the knowledge elements from among the knowledge elements based at least on the rank scores assigned to the knowledge elements; and providing, in response to the request, information associated with the entity and the one or more selected knowledge elements.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, a knowledge element is at least one of a known fact related to the entity or an item of content related to the entity.

In other implementations, assigning rank scores to the plurality knowledge elements comprises determining item types associated with the context items that are associated with the entity that is referenced by the search query; determining element types associated with one or more of the knowledge elements; and assigning rank scores to the knowledge elements, based at least on the item types associated with the items that are associated with the entity that is referenced by the search query, and the element types associated with the knowledge elements.

In certain aspects, providing information associated with the entity and the one or more selected knowledge elements comprises providing data that causes information associated with the entity and the one or more selected knowledge elements to be presented in a knowledge panel, the knowledge panel being presented with a search results page associated with the search query.

In other aspects, providing data that causes information associated with the entity and the one or more selected knowledge elements to be presented in the knowledge panel comprises determining, based on identifying the one or more context items that are associated with the entity that is referenced by the search query, a position of the knowledge panel, wherein the determined position defines a position of the knowledge panel being presented with the search results page associated with the search query; and providing, in response to the request, data that causes the knowledge panel to be presented with the search results page such that the position of the knowledge panel presented with the search results page corresponds to the determined position.

In some implementations providing data that causes information associated with the entity and the one or more selected knowledge elements to be presented in the knowledge panel comprises determining, based on identifying the one or more context items that are associated with the entity that is referenced by the search query, a number of knowledge elements to select for presentation in the knowledge panel; and providing, in response to the request, data that causes the knowledge panel to be presented with the search results page such that the knowledge panel includes the determined number of knowledge elements selected for presentation in the knowledge panel.

In other implementations, providing data that causes information associated with the entity and the one or more selected knowledge elements to be presented in the knowledge panel comprises determining, based on identifying the one or more context items that are associated with the entity that is referenced by the search query, a position of each of the knowledge elements presented in the knowledge panel, wherein the determined position of each of the knowledge elements defines a position of each of the knowledge elements within the knowledge panel being presented with the search results page associated with the search query; and providing, in response to the request, data that causes the knowledge panel to be presented with the search results page such that the position of each of the knowledge elements within the knowledge panel presented with the search results page corresponds to the determined position of each of the knowledge elements.

In some implementations providing data that causes information associated with the entity and the one or more selected knowledge elements to be presented in the knowledge panel comprises determining, based on identifying the one or more context items that are associated with the entity that is referenced by the search query, to highlight text associated with one or more of the knowledge elements presented in the knowledge panel, wherein the determined highlighting of text defines a highlighting of text associated with one or more of the knowledge elements within the knowledge panel being presented with the search results page associated with the search query; and providing, in response to the request, data that causes the knowledge panel to be presented with the search results page such that the highlighting of text associated with one or more of the knowledge elements within the knowledge panel presented with the search results page corresponds to the determined highlighting of text.

In certain aspects, providing data that causes information associated with the entity and the one or more selected knowledge elements to be presented in the knowledge panel comprises determining, based on identifying the one or more context items that are associated with the entity that is referenced by the search query, a title or subtitle relating to one or more of the selected knowledge elements presented in the knowledge panel, wherein the determined title relating to one or more of the selected knowledge elements defines a title or subtitle relating to one or more of the selected knowledge elements within the knowledge panel being presented with the search results page associated with the search query; and providing, in response to the request, data that causes the knowledge panel to be presented with the search results page such that the title or subtitle relating to one or more of the selected knowledge elements within the knowledge panel presented with the search results page corresponds to the determined title or subtitle relating to one or more of the selected knowledge elements.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for processing search queries whereby a user provides a search query that identifies a particular entity and includes one or more additional context terms to a search engine. In response to the query, information related to the entity is presented to the user in a knowledge panel. For example, the user can provide the query, "Ronnie Wood The Rolling Stones" to a search engine. In response to the query, a search results page can be presented to the user, where the search results page includes a knowledge panel. The content presented in the knowledge panel can depend on the one or more additional context terms included in the query. The search results page can also include one or more search results relevant to the search query, in addition to the knowledge panel.

Figure 1:
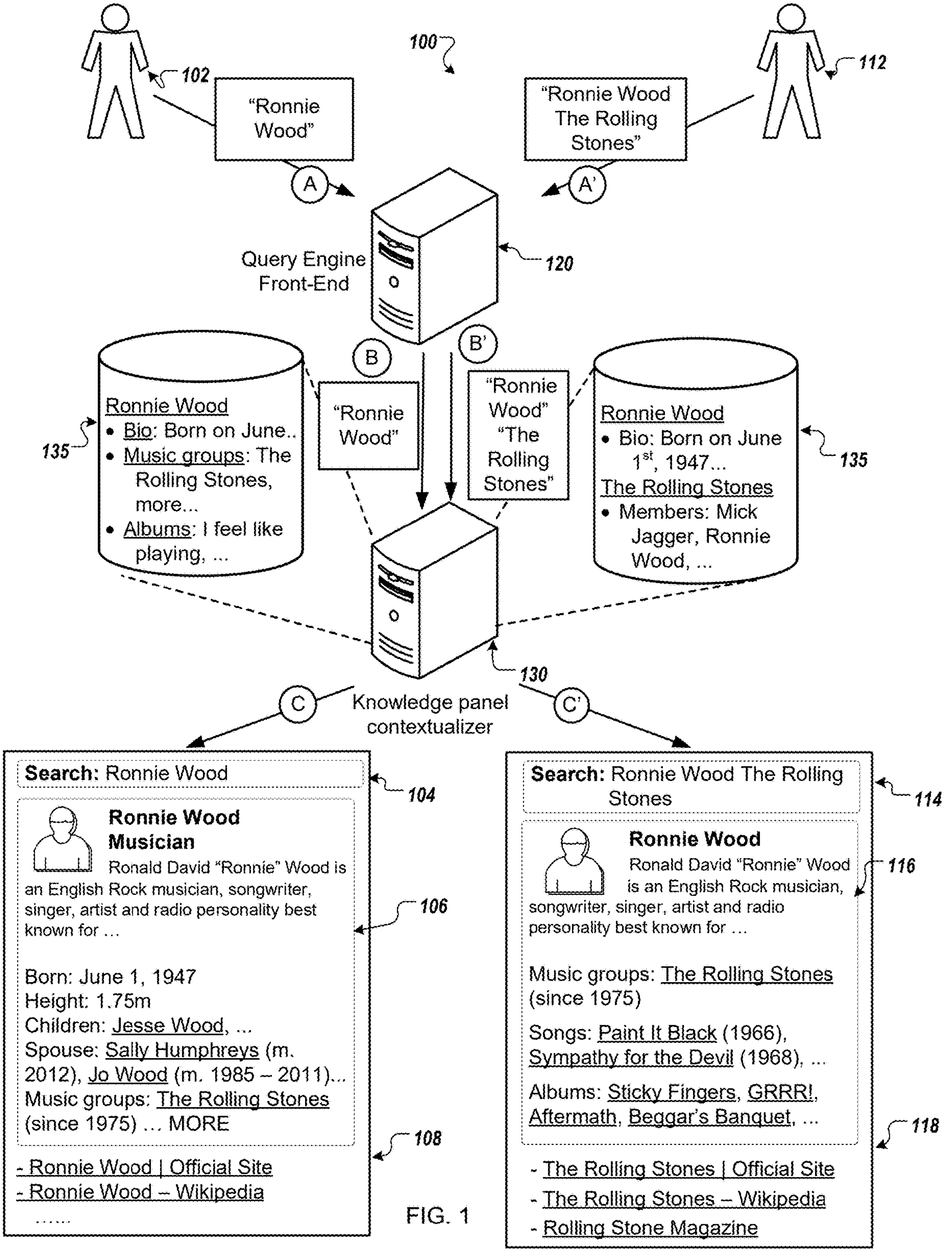
FIG. 1 depicts an example process for providing knowledge panels based on one or more context terms.

FIG. 1 illustrates an example process and system 100 for providing knowledge panels based on search queries that include context terms. The system 100 can be capable of receiving data that includes a user-input query and data that identifies context terms. An entity associated with the user-input query can be determined, and items that relate to the identified entity can be identified. Based on the identified items, the system 100 can select information related to the entity and context terms to include in a knowledge panel, and the system 100 can provide the knowledge panel that includes the selected information in a search results page along with one or more search results that are relevant to the identified entity.

Briefly, the system 100 includes a query engine front-end 120 and a knowledge panel contextualizer 130. The components of the system 100 can exchange electronic communications over one or more networks, or can exchange communications in another way, such as over one or more wired or wireless connections. As depicted in FIG. 1, the process associated with providing a knowledge panel in response to a user-input query and based on context terms can be accomplished by the system 100.

During operation (A and A') of the process for providing knowledge panels in response to user-input queries, the query engine front-end 120 receives data that includes user-input queries. For example, a user 102 can provide a query using a client device, such as the query, "Ronnie Wood" (A). Another user 112 can separately provide a query that includes one or more context terms, such as the query "Ronnie Wood The Rolling Stones," using a client device (A'). The query engine front-end 120 can receive data that includes the queries input by the users 102, 112. Based on the received data, the query engine front-end 120 can determine entities associated with the queries input by the users 102, 112, e.g., the musician "Ronnie Wood," and can identify queries input by users that include additional context terms, e.g., the search query "Ronnie Wood The Rolling Stones" submitted by user 112.

The query engine front-end 120 can identify an entity based on the user-input query. For example, the query engine front-end 120 can receive queries, such as the queries "Ronnie Wood" and "Ronnie Wood The Rolling Stones" from the users 102, 112, and the query engine front-end 120 can determine that the queries both identify the musician "Ronnie Wood." In some instances, the query engine front-end 120 can identify an entity associated with a user-input query by comparing terms of the query to one or more keyword phrases and/or by comparing terms of the user input to terms associated with known entities, e.g., to names of entities that are identified in a context terms database, or to names of entities that are identified in another database.

In addition to identifying an entity based on the user-input query, the query engine front-end 120 can identify one or more additional context terms. For instance, the query engine front-end 120 can determine that the user 112 who provided the query "Ronnie Wood The Rolling Stones" input a search query that included the context term "The Rolling Stones." In some implementations, the query front-end 120 can identify one or more additional context terms that are associated with the entity identified by the query engine front-end 120.

Based on identifying the entities referenced by the user-input queries and the identities of the one or more context terms, the query engine front-end 120 can transmit data that identifies the entities and the context terms to the knowledge panel contextualizer 130 during operation (B and B'). For example, the query engine front-end 120 can transmit data to the knowledge panel contextualizer 130 that identifies the musician "Ronnie Wood," (B) and can further transmit data to the knowledge panel contextualizer 130 that identifies both the context term "The Rolling Stones" and the musician "Ronnie Wood" (B').

The knowledge panel contextualizer 130 can receive data that identifies an entity referenced by a user-input query and data that identifies one or more context terms. For example, the knowledge panel contextualizer 130 can receive data that identifies the entity "Ronnie Wood." Based on receiving the data, the knowledge panel contextualizer 130 can access a database to identify content items that are associated with the "Ronnie Wood." Similarly, the knowledge panel contextualizer 130 can receive data identifying the context term "The Rolling Stones" associated with the entity "Ronnie Wood," and can identify content items that are associated with both "Ronnie Wood" and "The Rolling Stones."

Identifying content items that are associated with an entity identified from a user-input query can involve accessing a database associated with the knowledge panel contextualizer 130. For example, the knowledge panel contextualizer 130 can maintain a database 135 that includes entries that identify content items that correspond to the search query "Ronnie Wood" input by the user 102. Based on receiving data identifying "Ronnie Wood" the knowledge panel contextualizer 130 can identify entries in the database 135 that are associated with the "Ronnie Wood."

In another example, as shown in FIG. 1, the knowledge panel contextualizer 130 can receive data identifying "Ronnie Wood," as well as data identifying the context term "The Rolling Stones" and the knowledge panel contextualizer 130 can access the database 135 to identify items that are associated with "Ronnie Wood" and the context term "The Rolling Stones." For example, the knowledge panel contextualizer 130 can identify biographic information pertaining to the musician "Ronnie Wood," e.g., biographic information pertaining to "Ronnie Wood" such as date of birth, height, family members, career highlights, can identify the musician "Ronnie Wood" as a member of the band "The Rolling Stones", can identify music albums and songs performed or written by the musician "Ronnie Wood" with the band "The Rolling Stones," e.g., the songs "Paint It Black" and "Sympathy for the Devil," or the album "Sticky Fingers."

The items identified by the knowledge panel contextualizer 130 can include appropriate titles and subtitles, in both text format and as structured data required to generate a text format, relating to the data identifying the entity and the context terms. For example, the knowledge panel contextualizer 130 can identify the title or subtitle "Member of the Rolling Stones since 1975 (member_of: band=RollingStones, begin=1975)" upon receiving data identifying the entity "Ronnie Wood" and context term "The Rolling Stones." In other examples, the knowledge panel contextualizer 130 can receive data identifying the entity "The Rolling Stones" and the context term "Rock Band" and can identify the titles or subtitles "English Rock Band (origin: England)" or "Rock Band formed in 1962 in London (origin: location=London, begin=1962)."

Information to include in a knowledge panel can be selected based on identifying content items that are associated with the entity referenced by the user-input query and one or more context terms referenced by the user-input query. For example, based on receiving the search query "Ronnie Wood" the knowledge panel contextualizer 130 can select information to include in a knowledge panel that can be provided for output to the user 102. Similarly, based on receiving the search query "Ronnie Wood The Rolling Stones" the knowledge panel contextualizer 130 can select information to include in a knowledge panel that can be provided for output to the user 112.

Information included in a knowledge panel is selected such that the included information is relevant to the particular user-input search query. By identifying context terms and entities referenced by a user-input query, and selecting information based on identifying the context terms, the system 100 can present a knowledge panel that is specific to the user-input query. For example, based on determining that the user 102 input the search query "Ronnie Wood," the system 100 can select information that is likely more useful or of greater interest to the user 102, such as biographical information relating to "Ronnie Wood," information identifying the career highlights of "Ronnie Wood," or news that is relevant to the musician "Ronnie Wood." In another example, based on determining that the user 112 input the search query "Ronnie Wood The Rolling Stones," the system 100 can select information that is likely more useful or of more interest to the user 112, such as information identifying songs or albums written or performed by "Ronnie Wood" with the band "The Rolling Stones," or upcoming concerts featuring "Ronnie Wood" and "The Rolling Stones."

According to some implementations of the described subject matter, information selected for presentation in a knowledge panel can include various types of knowledge elements related to an entity referenced by a user-input query and one or more context terms referenced by a user-input query. In some instances, knowledge elements related to an entity can include biographical information relating to the entity, can include news or other publications relating to the entity, can include information relating to other entities that are associated with the entity, can include events associated with the entity, can identify or include content related to or produced by the entity, or can include other information that is identified as being relevant to the entity.

For example, information related to "Ronnie Wood" can include biographical information related to "Ronnie Wood," e.g., a biography of "Ronnie Wood," information relating to other members of "The Rolling Stones," or information relating to other people associated with "Ronnie Wood," can include information associated with content items relating to "Ronnie Wood," e.g., songs, albums, videos, or other content that feature "Ronnie Wood," can include information associated with other entities that are related to "Ronnie Wood," e.g., information identifying other artists that are similar to "Ronnie Wood," production companies, sponsors, or record labels associated with "Ronnie Wood," can include events or news related to "Ronnie Wood," e.g., upcoming concerts that feature "The Rolling Stones," articles or news stories relating to "Ronnie Wood," or can include any other information that is identified as being related to the entity, "Ronnie Wood."

In some instances, knowledge elements can be associated with content, such as a video, news article, or other content. In some implementations, selecting information to include in a knowledge panel can involve selecting particular knowledge elements that have associated content, and including the particular knowledge elements in the knowledge panel such that the content associated with a knowledge element can be viewed directly from the knowledge panel, e.g., by embedding a video in the knowledge panel for viewing by the user. In other implementations, particular knowledge elements can be included in the knowledge panel such that the content associated with a particular knowledge element is linked or otherwise made accessible to the user from the knowledge panel, e.g., by providing a link to a website associated with the content.

During operation (C and C'), information selected for presentation in knowledge panels can be presented for output to users. For example, the knowledge panel contextualizer 130 can select one or more knowledge elements to present to the user 102 in a knowledge panel, and can transmit information that causes a knowledge panel to be presented to the user 102, where the presented knowledge panel includes the selected knowledge elements. Similarly, the knowledge panel contextualizer 130 can select one or more knowledge elements to include in a knowledge panel, and can transmit information that causes a knowledge panel to be presented to the user 112 such that the knowledge panel includes the selected knowledge elements.

As shown in FIG. 1, knowledge panels can be presented to users in user interfaces that also include one or more search results that are relevant to the entity referenced by the user-input query and the context terms referenced by the user-input query. For example, a knowledge panel 106 can be presented to the user 102 in the user interface 104 along with one or more search results 108 in response to the user 102 inputting the query, "Ronnie Wood" at a client device (C). Similarly, a knowledge panel 116 can be presented to the user 112 in the user interface 114, where the user interface 114 also includes one or more search results 118 (C').

A knowledge panel can include information that has been selected based on identifying context terms referenced by a user-input query that are associated with an entity referenced by a user-input query. For example, the user 102 can provide the query "Ronnie Wood" at a client device associated with the user 102. In response to receiving the query, the knowledge panel contextualizer 530 can select, as information to include in a knowledge panel, information associated with a biography of "Ronnie Wood." The selected information can be presented to the user 102 in the knowledge panel 106 that is included in the user interface 104. Similarly, in response receiving a query from the user 112 that references "Ronnie Wood" and the context term "The Rolling Stones," the knowledge panel contextualizer 130 can select, as information to include in a knowledge panel, information associated with a biography of "Ronnie Wood," information identifying the music group "The Rolling Stones" and members of the band "The Rolling Stones," songs and albums written or performed by "Ronnie Wood" with the band "The Rolling Stones." The selected information can be presented to the user 112 in the knowledge panel 116 that is included in the user interface 114.

Figure 2:
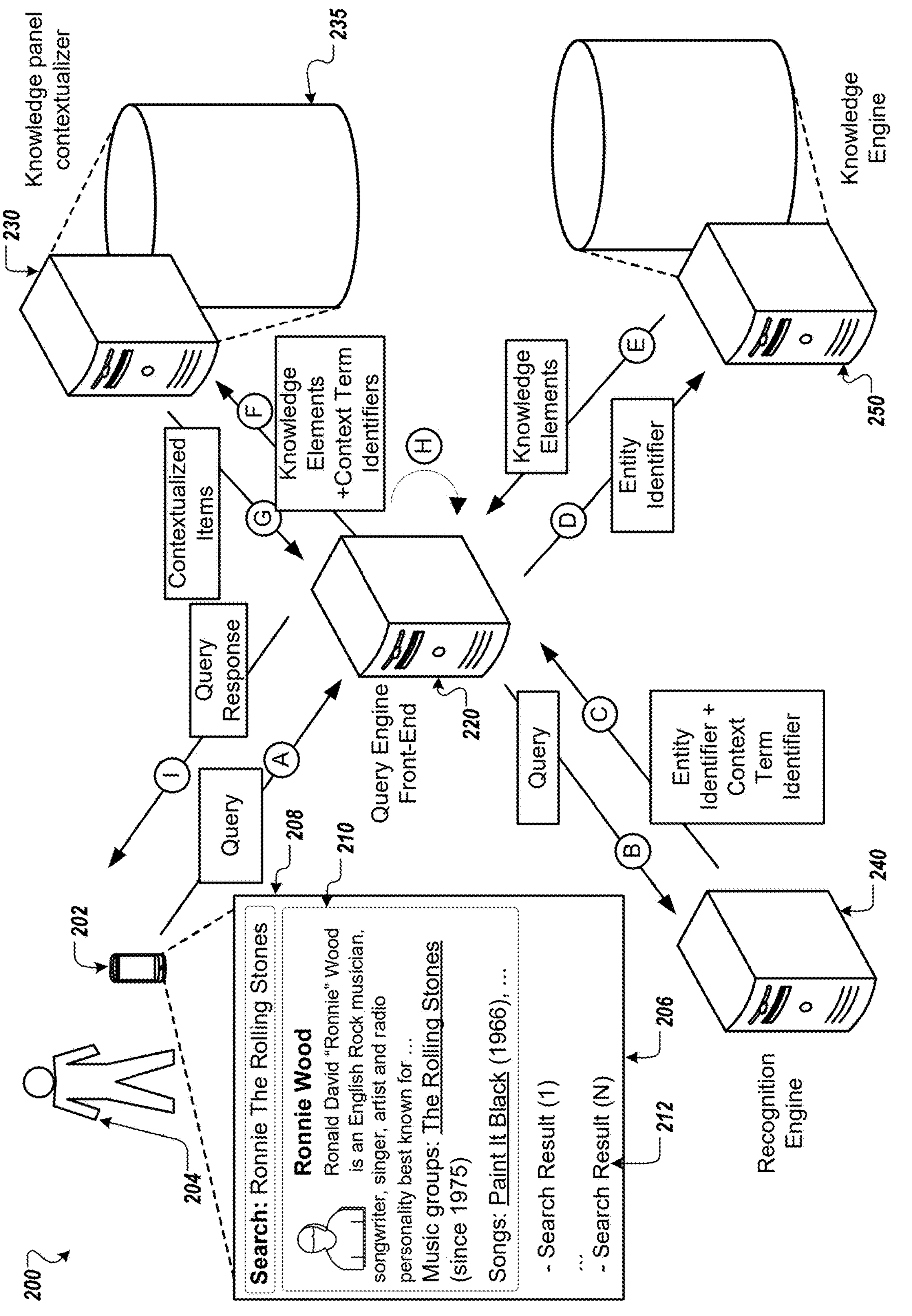
FIG. 2 depicts an example system for providing knowledge panels based on one or more context terms.

FIG. 2 depicts a system 200 for providing knowledge panels based on one or more context terms. Specifically, the system 200 addresses an implementation in which a query is received from a user, and a knowledge panel is provided in response to the user-input query, where information presented in the knowledge panel is dependent upon one or more context terms included in the user-input query.

Briefly, the system 200 can receive a query, such as a natural language query input by a user, and can identify an entity referenced by the query. The system 200 can also identify any additional context terms that are referenced by the query and can select information to present in a knowledge panel that is related to the entity based on identifying the context terms. A knowledge panel that includes the selected information can be provided for output to the user, such as by providing the knowledge panel in a search results page that includes one or more web search results that are relevant to the query. The system 200 includes a client device 202, query engine front-end 220, a knowledge panel contextualizer 230, an entity recognition engine 240, and a knowledge engine 250. The components of the system 200 can each be in communication over one or more networks, such as one or more LAN or WAN, or can be in communication through one or more other wired or wireless connections.

During operation (A), the query engine front-end 220 receives data encoding a query input by the user. For example, the user 204 can provide the query, "Ronnie The Rolling Stones" at the client device 202, and data encoding the query can be received by the query engine front-end 220. In some implementations, the query engine front-end 220 can receive the data encoding the user-input query over one or more networks, or over one or more other wireless or wired connections.

The client device 202 can be a mobile computing device, such as a mobile phone, smart phone, personal digital assistant (PDA), music player, e-book reader, tablet computer, a wearable computing device, laptop computer, desktop computer, or other portable or stationary computing device. The client device 202 can feature a microphone, keyboard, touchscreen, or other interface that enables the user 204 to input a query at the device. In some implementations, the user 204 can provide the query at an interface that is presented or accessible from the client device 202. For example, the user 204 can enter the query at a search engine that is accessible at the client device 202, can enter the query at a database that is accessible at the client device 202, or can provide the query at any other interface that features search capabilities, e.g., at a social network interface.

The user 204 can provide a natural language query at the client device 202, such as by speaking one or more terms of a query, typing one or more terms of a query, selecting one or more terms of a search query, e.g., from a menu of available terms, selecting a query that comprises one or more terms, e.g., from a menu of available queries, or by providing a query using any other method. In other implementations, the user 204 can provide a query using another method, for example, by selecting or submitting an image that the user would like to search for, by providing an audio or video sample of content that a user would like to search for, or by otherwise inputting a query at the client device 202.

Data that includes a query input by the user 204 and that identifies one or more context terms referenced by the query input by the user 204 can be received by the query engine front-end 220 in a single data packet or in multiple data packets. The data associated with the user-input query can further be received simultaneously, or can be received separately at different times.

Based on receiving the data encoding the query input by the user, the query engine front-end 220 can transmit the data associated with the user-input query to the recognition engine 240. For example, based on receiving data that includes the user-input query "Ronnie The Rolling Stones" the query engine front-end 220 can extract the data associated with the user-input query, "Ronnie The Rolling Stones" and can transmit data associated with the query to the recognition engine 240.

During operation (B), the recognition engine 240 can receive the information associated with the user-input query and can identify an entity associated with the user-input query and any additional context terms associated with the user-input query. For example, the recognition engine 240 can receive information associated with the query, "Ronnie The Rolling Stones" and can identify an entity associated with the query as the musician, "Ronnie Wood" and a context term associated with the query as the band "The Rolling Stones."

In some implementations, the recognition engine 240 can identify an entity associated with a query by comparing terms of the query to terms associated with a set of known entities. For example, the query received by the recognition engine 240 can be a natural language query, e.g., the query, "Ronnie The Rolling Stones" and the recognition engine 240 can identify the entity "Ronnie Wood" as being associated with the query based on comparing the terms of the query to terms associated with a set of known entities. In some implementations, a known set of entities can be accessible to the recognition engine 240 at a database, such as a database that is associated with the recognition engine 240 or that is otherwise accessible to the recognition engine 240, e.g., over one or more networks.

In some implementations, the recognition engine 240 can identify any additional context terms associated with a query by comparing the context terms to terms associated with a set of known context terms. For example, the query received by the recognition engine 240 can be a natural language query, e.g., the query, "Ronnie The Rolling Stones" and the recognition engine 240 can identify the context term "The Rolling Stones" as being associated with the query based on comparing the context terms of the query to context terms associated with a set of known context terms. In some implementations, a known set of context terms can be accessible to the recognition engine 240 at a database, such as a database that is associated with the recognition engine 240 or that is otherwise accessible to the recognition engine 240, e.g., over one or more networks.

In some instances, as described, a user-input query can be a spoken voice query, e.g., a query input by the user 204 by speaking into a microphone associated with the client device 202. In such instances, the query engine front-end 220 can transmit the data encoding the spoken voice query provided by the user 204 to the recognition engine 240, and the recognition engine 240 can obtain a transcription of the spoken voice query. For example, the query recognition engine 240 can be associated with or have access to an automatic speech recognition (ASR) engine, and can obtain a transcription of the spoken voice query based on submitting the data encoding the spoken voice query to the ASR engine. The recognition engine 240 can obtain a transcription of the spoken voice query, and can identify an entity associated with the query and any additional context terms by comparing terms of the transcription to terms associated with a set of known entities or context terms respectively.

In some implementations, the recognition engine 240 can identify an entity associated with a query and any additional context terms associated with a query by submitting one or more of the terms of the query to a search engine or by submitting one or more of the terms of the query to a database, and can identify an entity and any additional context terms associated with the query based on the results of providing the one or more terms of the query to a search engine or as a query to the database. For example, the recognition engine 240 can submit the terms "Ronnie Wood The Rolling Stones," "The Rolling Stones," or "Ronnie Wood" to a search engine, and can identify, as the entity referenced by the user-input query, an entity identified in results returned by the search engine. In some instances, the entity identified as associated with the user-input query can be the entity that is identified as the top search result, can be the entity that is the most prominent of the entities included in the search results, or can be identified from the search results in another way.

In some instances, the recognition engine 240 may identify more than one entity that may be referenced by a query input by the user 204, and the recognition engine 240 may select a single entity from among the possible entities. For example, based on receiving the query "Ronnie The Rolling Stones" the recognition engine 240 may determine that the query potentially references either the musician "Ronnie Wood," the band "The Rolling Stones" or the magazine "Rolling Stone." The recognition engine 240 can select a particular entity, such as the entity "The Rolling Stones" as the entity referenced by the user-input query.

Selecting a particular entity as being referenced by the user-input query from among multiple potential entities can involve additional analysis performed by the recognition engine 240. In some implementations, the recognition engine 240 can determine how similar the terms of the user-input query are to the terms associated with the potential entities, and can select the entity that is the nearest match to the query terms as the entity. For example, the recognition engine 240 can determine that the user-input query "Ronnie The Rolling Stones" can possibly reference the musician "Ronnie Wood," the band "The Rolling Stones," the magazine "Rolling Stone," or the record label "Rolling Stone Records." Based on determining that the terms of the query "The Rolling Stones" best matches the band "The Rolling Stones," the recognition engine 240 can select the musician "Ronnie Wood" as the entity referenced by the user-input query.

In other implementations, the recognition engine 240 can determine the entity that is the most frequently queried of the potential entities, and can select the most frequently queried entity as the entity referenced by the user-input query. For example, the recognition engine 240 can determine that the user-input query "Ronnie The Rolling Stones" can possibly reference the musician "Ronnie Wood," the band "The Rolling Stones," the magazine "Rolling Stone," the album "The Rolling Stones," or the record label "Rolling Stone Records." Based on determining that the most users query the musician "Ronnie Wood" and/or the band "The Rolling Stones" or that the majority of queries reference the band "The Rolling Stones" the recognition engine 240 can select the musician "Ronnie Wood" as the entity referenced by the user-input query.

In still other implementations, the recognition engine 240 can determine an importance measure or popularity measure associated with the potential entities, and can select the most important or most popular of the potential entities as the entity referenced by the user-input query. For example, the recognition engine 240 can determine a number of resources, e.g., websites, entries, content items, posts, etc., that are associated with each of the potential entities, and can determine a level of importance or popularity for each of the potential entities based on the number of resources associated with the entities. For instance, the musician "Ronnie Wood" may be associated with a greater number of websites, news articles, and posts than the record label "Rolling Stone Records," and therefore the musician "Ronnie Wood" and the band "The Rolling Stones" may have a greater measure of importance or popularity than "Rolling Stone Records." Based on the musician "Ronnie Wood" and/or the band "The Rolling Stones" having a greater measure of importance or popularity, the recognition engine 240 can identify the musician "Ronnie Wood" as the entity referenced by the user-input query.

In some implementations, terms of a user-input query may be used to disambiguate between multiple potential entities. For example, the recognition engine 240 can identify multiple potential entities associated with a user-input query and can further identify terms of a query that match one or more context terms associated with the user-input query. Based on determining that the terms of the query include additional context terms, the recognition engine 240 can identify a particular entity as being referenced by the query. For example, a user-input query may be "Rolling Stone band," and the recognition engine 240 may identify multiple potential entities referenced by the query, such as the band "The Rolling Stones," the magazine "Rolling Stone," and the record label "Rolling Stone Records." Based on determining that the term "band" included in the query is an additional context term, and based on determining that the context term is associated with an artist or musician entity type, the recognition engine 240 can identify the band "The Rolling Stones" as the entity referenced by the query.

Identifying an entity referenced by a user-input query and any additional context terms can, in some implementations, further involve identifying an entity identifier associated with the entity and context term identifiers associated with the context terms. For example, entities or context terms may be associated with a code or other identifier that uniquely identifies the entity or context term, e.g., an alphanumeric code that identifies the entity or context term, and identifying a particular entity or context term as referenced by a query can include identifying the code or other identifier that is associated with the entity or context term. For instance, the musician "Ronnie Wood" may be associated with an alphanumeric code that identifies the musician "Ronnie Wood," and based on identifying the entity "Ronnie Wood," the recognition engine 240 may further identify the alphanumeric code associated with the entity "Ronnie Wood."

Based on identifying an entity and any additional context terms that are referenced by the user-input query, the recognition engine 240 can transmit data that identifies the entity and any additional context terms to the query engine front-end 220 during operation (C). For example, the recognition engine 240 can identify the entity referenced by the query that was input by the user 204 as the musician "Ronnie Wood," and identify an additional context term referenced by the query that was input by the user 204 as the band "The Rolling Stones." The recognition engine 240 can transmit data to the query engine front-end 220 that identifies the entity and the context term. In some implementations, the recognition engine 240 can additionally determine identifiers that are associated with the referenced entity and additional context terms, and can transmit data that includes the entity identifier and context term identifiers to the query engine front-end 220 in addition to, or in lieu of, transmitting the data that identifies the referenced entity and the data that identifies the referenced context terms. The recognition engine 240 can transmit the data identifying the referenced entity and context terms and/or the entity identifier and context term identifiers to the query engine front-end 220 over one or more networks, or over one or more other wired or wireless connections.

At operation (D), the query engine front-end 220 can receive the data identifying the entity referenced by the user-input query and data identifying any additional context terms referenced by the user-input query, and can transmit the data identifying the entity to the knowledge engine 250. For example, the query engine front-end 220 can receive information identifying the entity referenced by the user-input query as the musician "Ronnie Wood," and can transmit data to the knowledge engine 250 that identifies "Ronnie Wood." In some instances, the query engine front-end 220 can transmit the data identifying the referenced entity to the knowledge engine 250 over one or more networks, or over one or more other wired or wireless connections.

The knowledge engine 250 can receive the data identifying the referenced entity, and can identify one or more knowledge elements that are related to the entity. As described, knowledge elements related to an entity can include any information that is related to the referenced entity or to entities that are associated with the referenced entity. For example, knowledge elements can include informational knowledge elements, e.g., biographical information associated with an entity, can include content knowledge elements, e.g., pictures, videos, or audio that are associated with or feature an entity, resource knowledge elements, e.g., websites or social network pages that are associated with an entity, relationship knowledge elements, e.g., information that indicates how an entity is associated with one or more other entities, can include news knowledge elements, e.g., articles or posts that feature or relate to the entity, or can include any other information type that can be represented or presented in a user interface of a computing device.

In some implementations, the knowledge engine 250 can identify knowledge elements related to an identified entity based on accessing a database or server that maintains knowledge elements relating to entities. For example, the knowledge engine 250 can receive information that identifies the entity "Ronnie Wood," and the knowledge engine can access the database or server to identify knowledge elements that are associated with the entity "Ronnie Wood." In some implementations, the database or server accessed by the knowledge engine 250 can be a database or server that is associated with the knowledge engine 250, e.g., as a part of the knowledge engine 250, or the knowledge engine 250 can access the database or server, e.g., over one or more networks.

The database or server can store knowledge elements that relate to various entities, and the knowledge engine 250 can obtain or identify knowledge elements that are related to the entity referenced by the query input by the user 204. For example, the knowledge engine 250 can identify knowledge elements that are related to the musician “Ronnie Wood” at the database or server. The knowledge engine 250 can identify the related knowledge elements based on performing a search of the database or server for knowledge elements that are related to “Ronnie Wood” or by performing a search for knowledge elements that are related to an entity identifier that uniquely identifies “Ronnie Wood.” In other implementations, the knowledge engine 250 can identify the related knowledge elements by accessing entries at the database or server that are distinctly related to the identified entity. For example, the database or server may maintain a folder or other data store that includes knowledge elements related to “Ronnie Wood,” and the knowledge engine 250 can obtain or identify the knowledge elements related to “Ronnie Wood.”

In some implementations, knowledge elements relating to entities can include information that is accessed by the database or server, or that is transmitted to and stored by the database or server. For example, information that is identified as being related to a particular entity can be stored at the database or server as a knowledge element relating to the entity. For instance, a video relating to “Ronnie Wood” and a news article relating to “Ronnie Wood” can be identified and stored at the database or server as knowledge elements that relate to “Ronnie Wood.” In some instances, the video and the news article can be identified by the database or server, e.g., based on performing a periodic web search for “Ronnie Wood” or based on determining that new content relating to “Ronnie Wood” is available on the web, or the video and the news article can be stored to the database or server as being related to “Ronnie Wood,” e.g., based on a moderator or user of the system 200 providing information to the database or server that identifies the video and news article as relating to “Ronnie Wood.”

In some implementations, the knowledge engine 250 can obtain or identify knowledge elements related to an identified entity based on providing a query for the entity and receiving query results that are identified as being related to the entity. For instance, the knowledge engine 250 can provide a query to a search engine or other searchable resource for “Ronnie Wood,” and can receive query results. The knowledge engine 250 can identify one or more of the query results as knowledge entities associated with the identified entity. In some instances, the knowledge engine 250 may be able to identify a subset of information included in a search result as a knowledge element or as being representative of the knowledge element, e.g., by crawling resources related to the search results and extracting portions of the resources that are identified as being the most relevant to the entity referenced by the user-input query.

In some implementations, knowledge elements relating to entities can be associated with one or more attributes. In some instances, attributes associated with knowledge elements can be stored in metadata associated with the knowledge elements, can be stored within the knowledge element content, or can otherwise be stored in association with the knowledge element, e.g., in a data store that stores the attributes in a data table or other construct such that the attributes are associated with the knowledge elements.

Attributes associated with a knowledge element can include an element type associated with the knowledge element. For example, a knowledge element may be identified as an informational knowledge element, e.g., relating to biographical information for the entity, as a content knowledge element, e.g., image, video, or audio associated with the entity, as a resource knowledge element, e.g., a website associated with the entity, as a relationship knowledge element, e.g., that identifies other entities related to the identified entity, as a news knowledge element, e.g., a post or article about the entity, or can be categorized as another element type.

Attributes associated with a knowledge element can also include a rank score associated with the knowledge element. For instance, a knowledge element may be assigned a rank score based on numerous factors, and the rank score may be associated with the knowledge element. Such factors can include, for example, how recently the knowledge element was generated or obtained, e.g., how recently a news article was published, can include how popular or important the knowledge element is deemed to be, e.g., based on how many views or clicks the knowledge element or a resource associated with the knowledge element has received, can include how fundamental the knowledge element is to the entity, e.g., whether the knowledge element is associated with basic biographical information such as an age of an entity or a location of a place, or can include other factors. In some instances, the knowledge engine 250 may assign the rank score to the knowledge element, or the rank score can be assigned to the knowledge element by another system or assigned to the knowledge item by a person, e.g., a moderator or user of the system 200.

Other attributes can be associated with a knowledge element and stored in association with the knowledge element. For example, other attributes associated with a knowledge element can include a data associated with the knowledge element, a location associated with the knowledge element, a file size and/or physical display size associated with the knowledge element, a summary of the knowledge element, or other information pertinent to the knowledge element or to providing the knowledge element for display in a knowledge panel.

In some implementations, in addition to identifying knowledge elements that are associated with the referenced entity, the knowledge engine 250 can access additional information associated with the knowledge items. For example, the knowledge engine 250 can identify entities associated with the knowledge elements, can access summaries or biographical information of the knowledge elements, or can access other information associated with the knowledge elements.

Based on identifying the one or more knowledge elements that are related to the entity referenced by the user-input query, the knowledge engine 250 can transmit data that identifies the knowledge elements identified for the referenced entity to the query engine front-end 220 during operation (E). For example, the knowledge engine 250 can obtain and/or identify one or more knowledge elements that are related to the musician “Ronnie Wood,” and can transmit data to the query engine front-end 220 that includes or identifies the knowledge elements. The knowledge engine 250 can transmit the data that includes or identifies the knowledge elements to the query engine front-end 220 over one or more networks, or over one or more other wired or wireless connections. The query engine front-end 220 can receive the data that includes or identifies the knowledge elements from the knowledge engine 250.

At operation (F), the query engine front-end 220 can transmit data that identifies the knowledge elements identified for the entity referenced by the user-input query and data identifying any additional context terms referenced by the user-input query to the knowledge panel contextualizer 230. For example, the query engine front-end 220 receives information identifying the entity referenced by the query input by the user 204 as the musician "Ronnie Wood," and the query engine front-end 220 can transmit data to the knowledge panel contextualizer 230 that identifies knowledge elements identified for the entity "Ronnie Wood." Additionally, the query engine front-end 220 can transmit data that includes an identifier of one or more context terms referenced by the query input by the user 204. For example, the query engine front-end 220 can transmit data to the knowledge panel contextualizer 230 that identifies the context term "The Rolling Stones." In some instances, the query engine front-end 220 can transmit the data identifying the knowledge elements identified for the referenced entity and the data identifying the one or more context terms to the knowledge panel contextualizer 230 over one or more networks, or over one or more other wired or wireless connections.

The knowledge panel contextualizer 230 can receive the data identifying the knowledge elements identified for the entity referenced by the user-input query and the data identifying the additional context terms referenced by the user-input query. The knowledge panel contextualizer can assign scores to and rank the one or more knowledge elements that are associated with the referenced entity based on the additional context terms. The rank scores can be used to provide responses to user input search queries in order to satisfy a user's interests and indicate to a user that their intent was understood.

Rank scores associated with the knowledge elements can be assigned and/or adjusted based on identifying the one or more additional context terms. For example, the knowledge panel contextualizer 230 may receive information identifying the musician "Ronnie Wood" and information identifying the context term "The Rolling Stones." The knowledge panel contextualizer 230 can then score and rank one or more knowledge elements that are associated with the musician "Ronnie Wood" in relation to the context term "The Rolling Stones" by accessing a content database 235.

In other examples, the knowledge panel contextualizer 230 may receive data identifying knowledge elements identified for the entity "Salman Khan" referenced by a user query, as well as data identifying the additional context term "Academy." The knowledge panel contextualizer 230 can then score and rank one or more of the knowledge elements associated with "Salman Khan" in relation to the context term "Academy" by accessing a content database 235. The knowledge elements associated with the educator "Salman Khan" may appear higher in the ranking than knowledge elements associated with the Bollywood actor Salman Khan.

In other examples, the knowledge panel contextualizer 230 may receive data identifying knowledge elements identified for the entity "Faith Hill" referenced by a user query, as well as data identifying the additional context term "2014." The knowledge panel contextualizer 230 can then score and rank one or more of the knowledge elements associated with "Faith Hill" in relation to the context term "2014" by accessing a content database 235. The knowledge elements associated with the singer's career and achievements in 2014, e.g., awards won, songs released or movies acted in, may appear higher in the ranking than knowledge elements associated with other years.

In yet other examples, the knowledge panel contextualizer 230 may receive data identifying knowledge elements identified for the entity "Boyz n the Hood" referenced by a user query, as well as data identifying the additional context term "Doughboy." The knowledge panel contextualizer 230 can then score and rank one or more of the knowledge elements associated with "Boyz n the Hood" in relation to the context term "Doughboy" by accessing a content database 235. The knowledge elements associated with the character "Doughboy," the cast list of the movie or the actor "Ice Cube" may appear higher in the ranking than knowledge elements associated with other aspects of the movie, e.g., release date, synopsis, ratings.

Rank scores can be assigned and/or adjusted based on element types associated with the knowledge elements that are associated with the entity. For example, based on determining that the context terms refer to songs written by "Ronnie Wood" assigned or adjusted rank scores associated with knowledge elements that identify or include songs written by "Ronnie Wood" may be higher than assigned or adjusted rank scores associated with knowledge elements that identify or include music videos that feature "Ronnie Wood."

Other factors can be considered when assigning and/or adjusting rank scores associated with knowledge elements. In some implementations, rank scores associated with knowledge elements can be assigned and/or adjusted based on determining how recently the information was released. For example, a knowledge element associated with a news article that was published within the past month may have an assigned or adjusted rank score that is higher than a knowledge element associated with a news article that was published six months ago.

In some implementations, rank scores associated with knowledge elements can be assigned and/or adjusted based on determining a quality of the information associated with the knowledge element. For example, the knowledge engine 250 or the query engine front-end 220 can determine a number of views, e.g., web hits, that information associated with a knowledge element has received, a number of posts mentioning the information associated with the knowledge element, links to the information associated with the knowledge element, and/or a number of links that the information associated with the knowledge element has to other resources or information. Knowledge elements associated with information that have received more views, a greater number of mentions in posts, a greater number of links to the information, and/or a greater number of links to other resources or information can be identified as being of a higher quality than knowledge elements associated with information receiving fewer views and mentions, and that are associated with fewer links. A rank score associated with knowledge element can be assigned and/or adjusted based on the determined quality of the knowledge element, for example, such that higher quality knowledge elements are assigned higher rank scores than lower quality knowledge elements.

In some implementations, rank scores associated with knowledge elements can be assigned and/or adjusted based on identifying two or more context terms. For example, as described with respect to operation (F) of FIG. 2, based on identifying the entity "Ronnie Wood" from a query provided by the user 204 and two context terms "The Rolling Stones" and "songs", the knowledge panel contextualizer 230 can assign rank scores to knowledge elements based on both context terms. For example, based on identifying the context terms "The Rolling Stones" and "songs," assigned or adjusted rank scores associated with knowledge elements that identify or include information about songs written or performed by the member "Ronnie Wood" of the band "The Rolling Stones" may be higher than assigned or adjusted rank scores associated with knowledge elements that identify or include information about all other songs written or performed by the band "The Rolling Stones."

In some implementations, rank scores associated with knowledge elements can be assigned and/or adjusted based on determining an age group or suitability rating associated with the user 204 and/or knowledge elements related to a referenced entity. For example, the query engine front-end 220 can determine an age group of the user 204 based on a previous search history of the user 204, based on an account or profile of the user 204, based on parental controls associated with a web browser or other application used by the user 204, or based on other information. The query engine front-end 220 and/or the knowledge engine 250 may also determine a suitability rating associated with knowledge elements related to the referenced entity, e.g., based on identifying a suitability rating assigned to information associated with the knowledge element or based on performing other analysis, e.g., crawling the information associated with the knowledge element. Based on the determined age group of the user 204 and/or the suitability rating associated with a knowledge element, a rank score associated with the knowledge element can be assigned and/or adjusted.

In some implementations, interests of the user 204 can be identified, and rank scores associated with knowledge elements can be assigned and/or adjusted based on the interests of the user 204. In some implementations, a history of interactions of the user 204 with knowledge panels and/or with information included in knowledge panels, such as the user's selection of links included in the knowledge panels, can be determined, and rank scores associated with knowledge elements can be assigned and/or adjusted based on the interaction history of the user 204. In practice, other factors can be additionally or alternatively be considered in assigning and/or adjusting rank scores associated with knowledge elements, to enable the system 200 to provide relevant knowledge panels to a user in response to user-input queries.

The knowledge panel contextualizer 230 can assign or adjust the rank scores of the knowledge elements that are associated with the referenced entity and the one or more context terms referenced by the user-input query, and can transmit data identifying the knowledge elements and their corresponding rank scores to the query engine front-end 220 during operation (G). In some instances, the knowledge panel contextualizer 230 can transmit additional information associated with the ranked knowledge elements to the query engine front-end 220. According to some implementations, the knowledge panel contextualizer 230 can transmit the data identifying the ranked knowledge elements that are associated with the referenced entity and the one or more context terms referenced by the user-input query to the query engine front-end 220 over one or more networks, or over one or more other wired or wireless connections.

The query engine front-end 220 can receive data identifying the ranked knowledge elements that are associated with the referenced entity and the one or more context terms referenced by the user-input query. The query engine front-end 220 can select knowledge elements to include in a knowledge panel based on the rank scores of the knowledge elements during operation (H). In some implementations, selecting knowledge elements to include in a knowledge panel can include performing additional analysis with respect to the identified knowledge elements, information associated with the identified knowledge elements, and/or information associated with the one or more context terms referenced by the user-input query.

In some implementations, selecting one or more of the identified knowledge elements to include in a knowledge panel is based on the assigned rank scores associated with the knowledge elements. In some instances, selecting knowledge elements to include in a knowledge panel can include selecting a particular number of knowledge elements that are assigned the highest, or alternatively the lowest, rank scores. In other instances, selecting knowledge elements to include in a knowledge panel can include selecting all or a particular number of knowledge elements that are associated with assigned or adjusted rank scores that satisfy a rank score threshold, or can involve selecting knowledge elements based on the assigned or adjusted rank scores and one or more other criteria.

In addition to assigning and/or adjusting rank scores associated with knowledge elements, the query engine front-end 220 can determine other parameters related to presenting knowledge panels in response to user-input queries. For example, knowledge panels may be provided for display to users within search results pages, and the query engine front-end 220 can determine the placement of a knowledge panel among one or more other web search results within the search results page. For instance, a determination may be made to present the knowledge panel at the top of a search results page, e.g., before the listing of search results, or may be presented at a different location within the search results page, e.g., below the listing of search results, in the middle of the listing of search results, in a side panel beside the listing of search results, in a popup window within a search results page, or in another location such as in a separate web browser window or in a separate tab of a web browser.

In some implementations, the query engine front-end 220 can determine an order of knowledge elements to present in a knowledge panel based on the one or more context terms referenced by the user-input query. For example, a knowledge panel can be configured to present selected knowledge elements in a particular order based on the additional context terms, e.g., such that knowledge elements that are identified as being the most relevant to the user 204 or the most closely related to the referenced entity are presented first in the knowledge panel, with less relevant knowledge elements or elements that are not as related to the referenced entity being displayed further down in a listing of knowledge elements within the knowledge panel.

In some implementations, the query engine front-end 220 can determine to adjust other parameters relating to the presentation of knowledge elements within a knowledge panel, such as an amount of information to include in the knowledge panel, the types of information to present in the knowledge panel, or whether to display a knowledge panel or forgo displaying a knowledge panel.

Knowledge elements can be selected for presentation in a knowledge panel, and parameters relating to the presentation of the knowledge panel can be determined based at least on the assigned or adjusted rank scores associated with the knowledge elements. For example, as described, particular knowledge elements can be selected for inclusion in a knowledge panel based on the particular knowledge elements having the highest rank scores of the knowledge elements identified by the knowledge engine 250. In some instances, the particular knowledge elements can be selected based on the knowledge elements being associated with rank scores that satisfy a particular threshold, being associated with rank scores that satisfy a particular range of rank scores, or can be selected based on other factors.

In other examples, the position of a knowledge panel within a search results page can be dependent on the rank scores of one or more knowledge elements, such as the rank scores of knowledge elements selected for presentation in a knowledge panel. For instance, the query engine front-end 220 can determine to present a knowledge panel at the top of a search results page, e.g., before a listing of search results, or in the middle of a search results page, e.g., in the middle of a listing of search results, based on the rank scores of the knowledge elements included in the listing of search results. In another example, a number of knowledge elements to include in a knowledge panel can be determined based on determining a number of knowledge elements having rank scores that satisfy a rank score threshold. For instance, based on determining that only three knowledge elements are associated with rank scores that satisfy the threshold, only those three knowledge elements are presented in the knowledge panel, while if it is determined that five knowledge elements are associated with rank scores that satisfy the threshold, all five of the knowledge elements may be presented in the knowledge panel.

In some instances, rank scores associated with knowledge elements can consider all of the factors described, a subset of the factors described, or different factors, and selecting particular knowledge elements in a knowledge panel can involve selecting the knowledge elements based on the rank scores associated with the knowledge elements and other factors.

Similarly, in some implementations, parameters associated with the presentation of knowledge panels can be determined based on rank scores associated with knowledge elements in addition to other factors. For example, if one or more rank scores of one or more knowledge elements exceed or satisfy a predetermined threshold the query engine front-end 220 may determine to output a knowledge panel to the user 204. Conversely, if each rank score of the knowledge elements fail to exceed or satisfy a predetermined threshold, the query engine front-end 220 may determine to forgo outputting a knowledge panel to the user 204.

Based on selecting knowledge elements to include in a knowledge panel, and alternatively determining parameters relating to the presentation of a knowledge panel, the query engine front-end 220 can transmit information associated with the presentation of the knowledge panel to the client device 202 during operation (I). In some implementations, the query engine front-end 220 can transmit data associated with the one or more selected knowledge elements and data relating to the presentation of the knowledge panel to the client device over one or more networks, or over one or more other wired or wireless connections.

The client device 202 can receive the data associated with presenting a knowledge panel from the query engine front-end 220, and provide for output to the user 204 a knowledge panel that includes the selected knowledge elements. In some implementations, the client device 202 can receive information defining one or more parameters associated with the presentation of a knowledge panel, and can provide the knowledge panel for output to the user 204 such that the knowledge panel is displayed to the user according to the parameters.

In some implementations, the knowledge panel can be placed within a search results page that includes one or more search results that are relevant to the user-input query. For example, the client device 202 can display the user interface 206. The user interface 206 can be a search results page, where the user interface 206 includes a query entry field 208, a knowledge panel 210, and one or more search results 212. As shown, for example, the user interface 206 can display the knowledge panel 210 at the top of a search results page, e.g., above the listing of one or more search results 212. As shown in FIG. 2, in response to receiving the user-input query "Ronnie The Rolling Stones," the client device 202 has presented the knowledge panel 210 that includes an image of the musician "Ronnie Wood," and that includes a biography of the member "Ronnie Wood" and information relating to the band "The Rolling Stones."

As described, the user interface 206 presented to the user 204 can include one or more search results that are relevant to the user-input query. For instance, based on the user 204 providing the query "Ronnie The Rolling Stones" one or more search results 212 can be identified, and the one or more search results 212 can be presented in the user interface 206 presented to the user 204. The search results 212 identified in response to the query "Ronnie The Rolling Stones" can be the same search results regardless of the one or more context terms referenced by the user-input query, or the identified search results can be dependent upon one or more context terms referenced by the user-input query. In some instances, the search results identified can depend upon the knowledge elements presented in the knowledge panel 210. Search results can be determined based on submitting the user-input query to a search engine, and identifying or receiving one or more search results from the search engine, e.g., from a server associated with the search engine.

In some implementations, search results can be identified and can be transmitted to the client device 202. The client device 202 can receive the information identifying the search results and the data associated with presenting a knowledge panel and can configure a user interface to display both the search results and the knowledge panel. In other implementations, information associated with identified search results can be transmitted to the query engine front-end 220, and the query engine front-end 220 can transmit data to the client device 202 that includes information associated with presenting a knowledge panel and associated with the search results. The client device 202 can receive the information from the query engine front-end 220, and can provide the knowledge panel and the search results to the user 204 according to parameters associated with the presentation of the knowledge panel. In still other implementations, the query engine front-end 220 can transmit the information associated with presenting the knowledge panel to a search engine, and the search engine can transmit data to the client device 202 that includes the information associated with presenting the knowledge panel as well as information associated with one or more search results.

Figure 3:
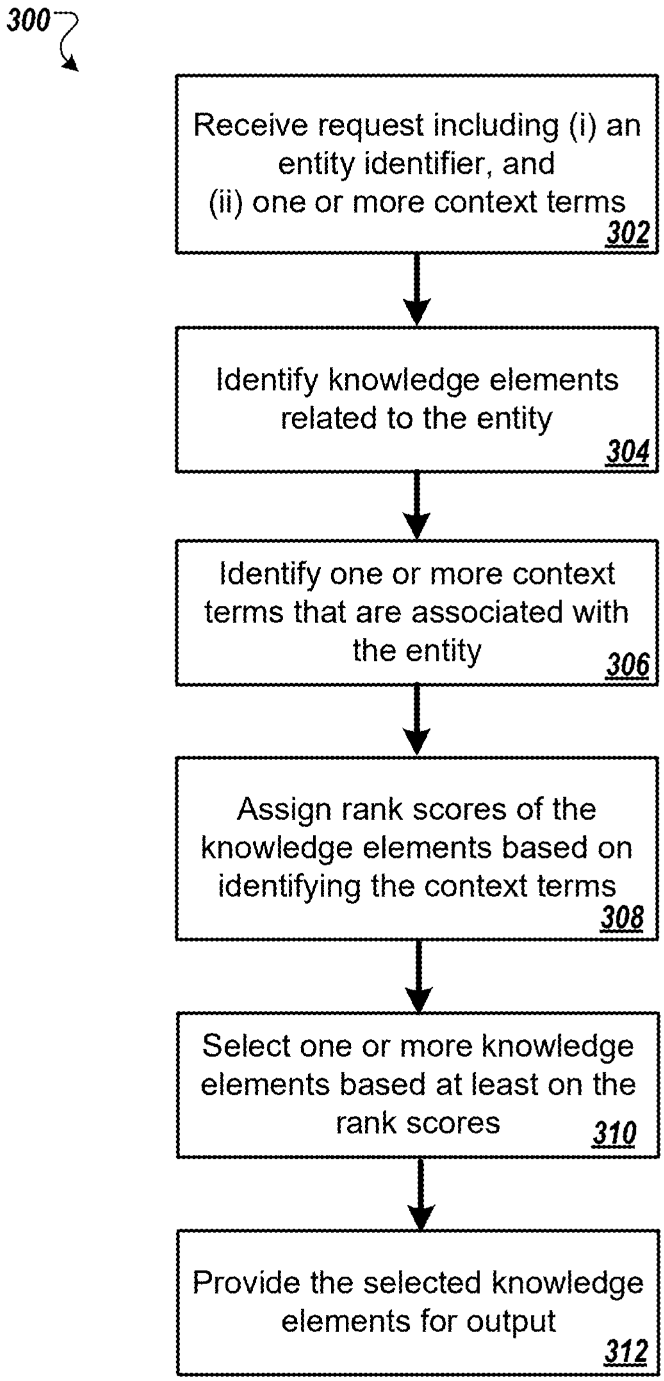
FIG. 3 depicts a flowchart of an example process for providing knowledge panels based on one or more context terms.

FIG. 3 presents an example process 300 for providing knowledge panels based on a media consumption history. For example, the process 300 can be performed by the system 200 in response to receiving a query input by a user 204.

At step 302, a request is received that identifies an entity and that identifies one or more context terms. In some instances, the request can be received as a request associated with a search query that has been submitted by a user. For example, the query engine front-end 220 can receive data that identifies both an entity and one or more context terms referenced by a query input by the user 204. In some instances, the query engine front-end 220 can receive data encoding a user-input query from a client device 202, and can transmit the data encoding the user-input query to the entity recognition engine 240. The entity referenced by the query can be identified by the entity recognition engine 240, and the entity recognition engine 240 can transmit data to the query engine front-end 220 that includes an identifier for the entity. In other implementations, the data received by the query engine front-end 220 can identify both the entity and the one or more context terms. For example, the query engine front-end 220 can receive data from the client device 202 that includes an identifier that uniquely identifies an entity referenced by the user-input query and an identifier that uniquely identifies one or more context terms referenced by the user-input query. The query engine front-end 220 can receive the data that identifies the entity referenced by the user-input query and the data identifying the one or more context terms over one or more networks, or over one or more other wired or wireless connections.

At step 304, knowledge elements related to the entity are identified. For example, the query engine front-end 220 can receive data identifying an entity referenced by the user-input query, and can identify knowledge elements that are related to the entity. In some implementations, the query engine front-end 220 can identify knowledge elements related to the entity by transmitting data identifying the entity to the knowledge engine 250, and receiving data from the knowledge engine 250 that includes or identifies knowledge elements related to the entity. In some instances, the query engine front-end 220 can send data identifying the entity and receive data associated with knowledge elements that relate to the entity from the knowledge engine 250 over one or more networks, or over one or more wired or wireless connections.

At step 306, one or more context terms that are associated with the entity are identified. For example, the query engine front-end 220 can receive data identifying one or more context terms referenced by the user-input query, and can identify one or more of the context terms that are associated with the entity. In some implementations, the query engine front-end can identify one or more of the context terms that are associated with the entity by transmitting data identifying the entity referenced by the user-input query and data identifying the context terms to the knowledge engine 250, and receiving data from the knowledge engine 250 that include or identifies knowledge elements related to both the entity and the context terms. In some instances, the query engine front-end 220 can send data identifying the entity referenced by the user-input query and data identifying the context terms to the knowledge engine 250, and receiving data from the knowledge engine 250 that include or identifies knowledge elements related to both the entity and the context terms, or over one or more wired or wireless connections.

At step 308, rank scores associated with the knowledge elements are assigned based on identifying the one or more context terms referenced by the user-input query and that are associated with the entity referenced by the user-input query. For example, the query engine front-end 220 can receive knowledge elements related to the referenced entity from the knowledge engine 250 and identify context terms that are associated with the referenced entity. The query engine front-end 220 can assign and/or adjust rank scores associated with the knowledge elements related to the referenced entity based on identifying the associated context terms, for example, by using the processes described with respect to operation (H) of FIG. 2. In some implementations, the query engine front-end 220 can receive the knowledge elements and the data identifying the one or more context terms that are related to the referenced entity over one or more networks, or over one or more wired or wireless connections.

At step 310, one or more knowledge elements are selected to be included in a knowledge panel, where selection of the knowledge elements is based at least on the rank scores assigned to the knowledge elements. For example, the query engine front-end 220 can select, based on the rank scores assigned to the knowledge elements, one or more of the knowledge elements to include in a knowledge panel, where the knowledge panel can be presented to the user 204 in response to receiving the user-input query. For instance, the query engine front-end 220 can select a certain number of knowledge elements that are associated with the highest rank scores, can select knowledge elements associated with rank scores that satisfy a particular threshold, or can select knowledge elements associated with rank scores that satisfy one or more other criteria. In some implementations, other data associated with the knowledge elements can be considered when selecting the knowledge elements to present in a knowledge panel. For example, a knowledge element may be selected based on how recent it is, how popular it is, or how important it is determined to be, e.g., based on a number of links associated with the knowledge element, in addition to selecting the knowledge element based on its assigned rank score.

At step 312, the selected knowledge elements are provided for output, where the selected knowledge elements are presented in a knowledge panel. For example, the query engine front-end 220 can transmit data to the client device 202, or to another system, e.g., a search engine, that causes the selected knowledge elements to be included in a knowledge panel and provided for output to the user 204. In some implementations, the knowledge panel can be presented within a search results page that includes one or more search results that are relevant to the user-input query. The query engine front-end 220 can transmit the data related to providing the knowledge panel that includes the selected knowledge elements over one or more networks, or over one or more other wired or wireless connections. Presentations of selected knowledge elements in corresponding knowledge panels are described in more detail below with reference to FIG. 4A to 4D.

FIGS. 4A to 4D illustrate example user interfaces 400, 420, 440, 460 that present knowledge panels based on one or more context terms. In some implementations, the user interfaces 400, 420, 440, 460 can be presented to users in response to a user-input query. In some implementations, the user interfaces 400, 420, 440, 460 can be presented in a web browser or other application that is capable of providing users with a query feature, e.g., in search results page provided by a search engine that is accessible to users via a web browser.

Figure 4B:
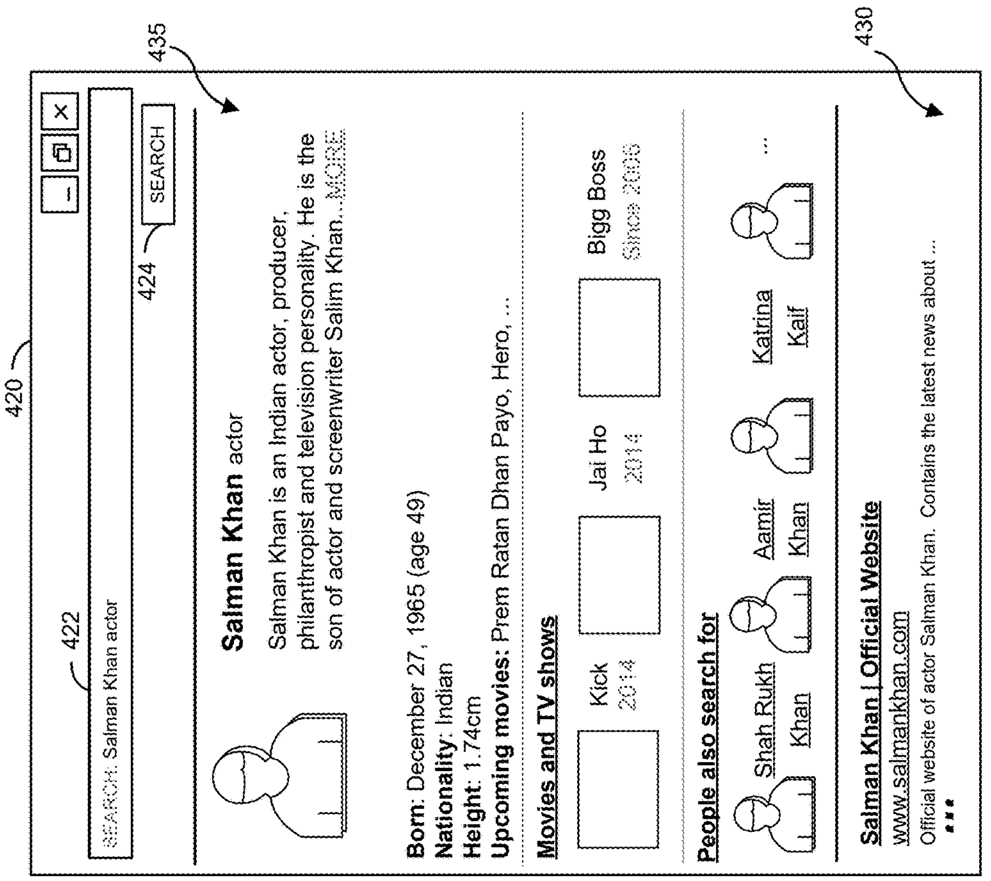
FIGS. 4A to 4D depict example user interfaces that provide knowledge panels based on one or more context terms.
Figure 4A:
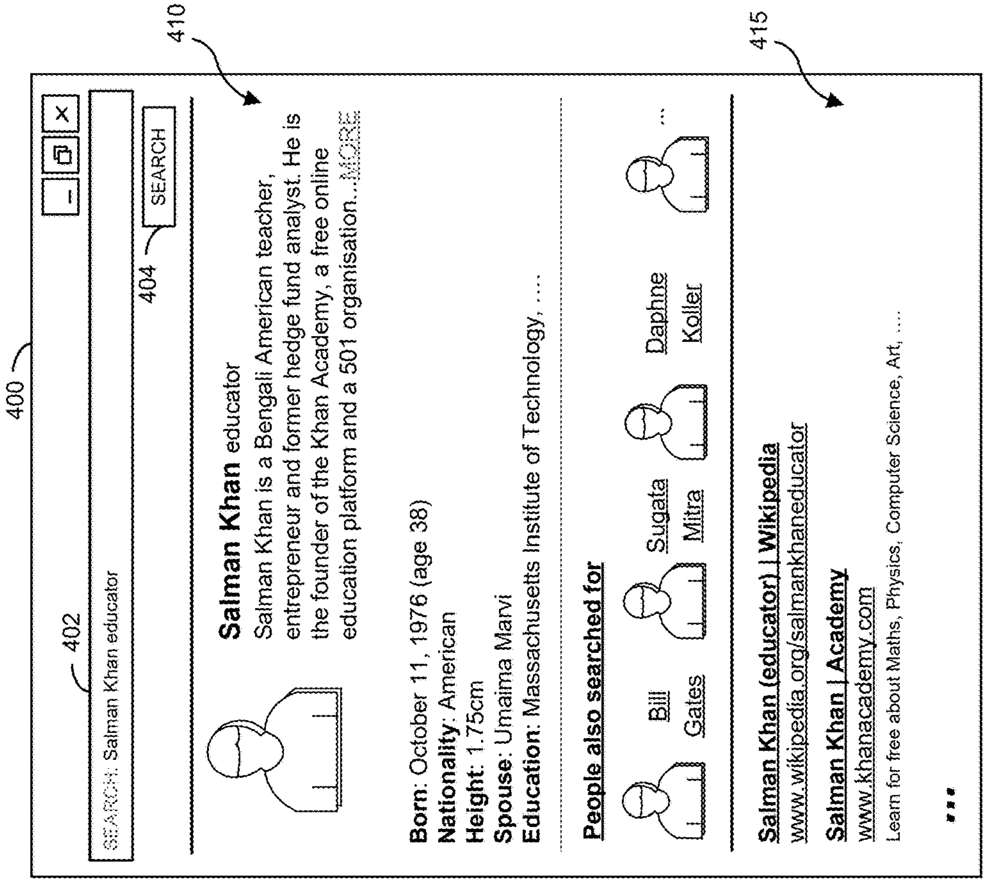

The user interface 400 depicted in FIG. 4A is a representative user interface for displaying knowledge panels in response to a query input by a user. In some implementations, the user interface 400 can be presented to a user in response to the user providing a query at a search engine or other system that enables users to provide requests for information. Briefly, the user interface 400 includes a query entry field 402, a query request control 404, a knowledge panel 410, and search results 415.

The user interface 400 can be presented in response to a query input by a user. For example, as shown in FIG. 4A, a user has input the query "Salman Khan educator" at the query entry field 402, and the user interface 400 can be presented to the user in response to the user selecting the query request control 404. The information included in the knowledge panel 410 has been selected for inclusion in the knowledge panel 410 based on identifying the context term "educator" that is associated with the entity "Salman Khan" referenced by the query input. Additionally, the knowledge panel 410 is presented above the search results 415 in the user interface 400.

The user interface 400 presented in response to the user-input query can include a knowledge panel 410 that presents information relating to the educator "Salman Khan." As shown, the knowledge panel 410 identifies Salman Khan and includes a biography of "Salman Khan, educator," e.g., the excerpt of the biography describing that, "Salman Khan is a Bengali American teacher, entrepreneur and former hedge fund analyst . . . ," where the user has the option to view more of the biography, includes a list of facts about the educator Salman Khan, e.g., birth date, nationality, height, spouses, education, and includes a panel identifying entities people may also be interested in searching for, e.g., "Bill Gates," "Sugata Mitra" and "Daphne Koller," where the user has the option to view more of the panel by scrolling to the right.

The user interface 400 additionally presents search results 415 that are relevant to the query "Salman Khan educator." For example, as shown in FIG. 4A, the search results 415 include results for an online encyclopedia entry for "Salman Khan," e.g., a Wikipedia article for "Salman Khan (educator)," and a website for the Khan academy founded by the educator "Salman Khan," where the user has the option to view more of the search results by scrolling downwards.

The user interface 420 depicted in FIG. 4B presents another user interface that can be presented in response to a query input by a user. For example, as shown in FIG. 4B, a user has input the query "Salman Khan, actor" at the query entry field 422, and the user interface 420 can be presented to the user in response to the user selecting the query request control 424. In this example, the information included in the knowledge panel has been selected for inclusion in the knowledge panel 435 based on identifying the entity "Salman Khan," as in FIG. 4A, and based on identifying the context term "actor" that is associated with the entity "Salman Khan" referenced by the query input, as opposed to the context term "educator" as depicted in FIG. 4A. As in FIG. 4A, the knowledge panel 435 is presented above the search results 430 in user interface.

The user interface 420 presented in response to the user-input query can include a knowledge panel 435 that presents information relating to the actor "Salman Khan." As shown, the knowledge panel 435 identifies Salman Khan and includes a biography of "Salman Khan, actor," e.g., the excerpt of the biography describing that, "Salman Khan is an Indian actor, producer, philanthropist and television personality . . . ," where the user has the option to view more of the biography, includes a list of facts about the actor Salman Khan, e.g., birth date, nationality, height, upcoming movies, includes a panel identifying movies and TV shows that the actor Salman Khan has appeared in, e.g., "Kick," "Jai Ho" and "Bigg Boss" and includes a panel identifying entities people may also be interested in searching for, e.g., "Shah Rukh Khan," "Aamir Khan" and "Katrina Kaif," where the user has the option to view more of both panels by scrolling to the right.

The user interface 420 additionally presents search results 430 that are relevant to the query "Salman Khan actor." For example, as shown in FIG. 4B, the search results 430 include results for the official website of Salman Khan, where the user has the option to view more search results by scrolling downwards.

Figure 4C:
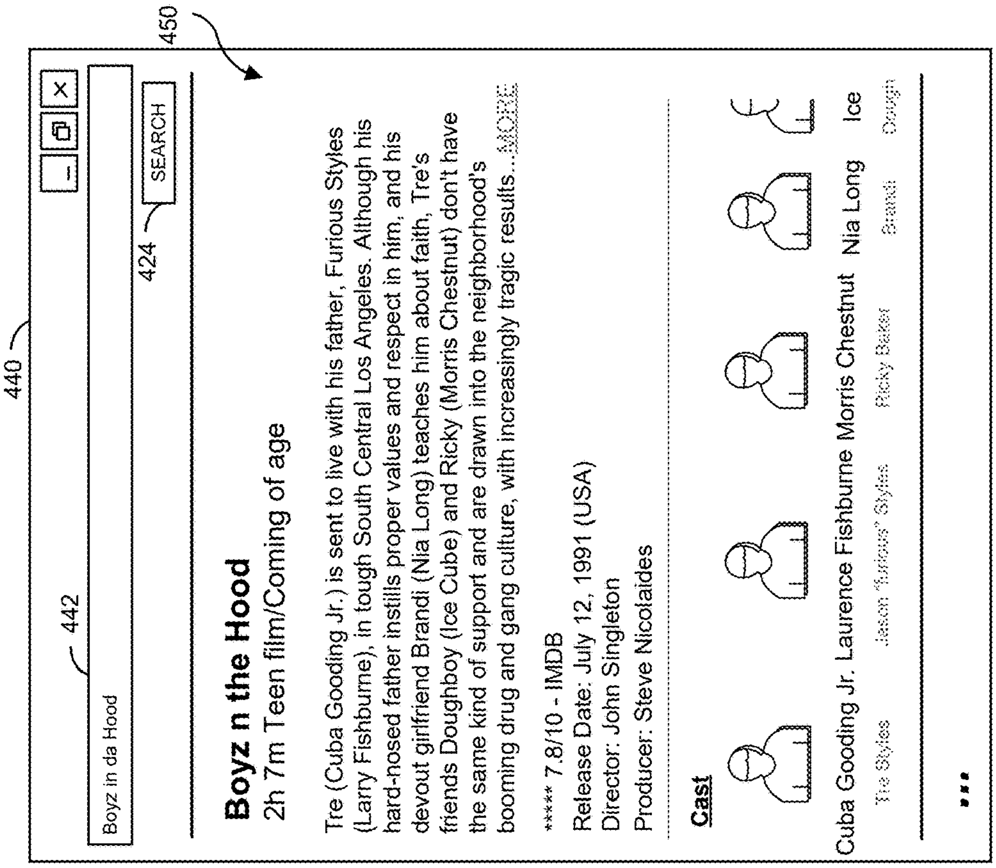

The user interface 440 depicted in FIG. 4C is another representative user interface for displaying knowledge panels in response to a query input by a user that does not include additional context terms. In some implementations, the user interface 440 can be presented to a user in response to the user providing a query at a search engine or other system that enables users to provide requests for information. Briefly, the user interface 440 includes a query entry field 442, a query request control 444 and a knowledge panel 450.

The user interface 440 can be presented in response to a query input by a user. For example, as shown in FIG. 4C, a user has input the query "Boyz in da Hood" at the query entry field 442, and the user interface 440 can be presented to the user in response to the user selecting the query request control 444. The information included in the knowledge panel 440 has been selected for inclusion in the knowledge panel 440 based on identifying the movie "Boyz n the Hood" referenced by the query input.

The user interface 440 presented in response to the user-input query can include a knowledge panel 450 that presents information relating to the movie "Boyz n the Hood." As shown, the knowledge panel 410 identifies the title of the movie "Boyz n the Hood," the length of the duration of the movie, e.g, 2 h 7 m, the genre of the movie, e.g., "Teen film/Coming of age", a synopsis of the movie describing how "Tre (Cuba Gooding Jr.) is sent to live with his father, Furious Styles (Larry Fishburne), in tough South Central Los Angeles . . . ," where the user has the option to view more of the synopsis, includes a list of facts about the movie, e.g., "IMDB" rating, release date, director, producer, and includes a panel identifying cast members, e.g., "Cuba Gooding Jr.," "Laurence Fishburne," "Morris Chestnut" and "Nia Long" where the user has the option to view more of the panel by scrolling to the right.

In this example, the user-input query does not include one or more additional context terms. If the user intended to search for information relating to the character "Tre Styles," the knowledge panel can be considered an adequate response, since, for example, the character "Tre Styles" appears first in the panel identifying cast members and characters of the movie "Boyz n the Hood." However, if the user intended to search for information relating to the character "Doughboy." The knowledge panel can be considered an inadequate response, since, for example, the character "Doughboy" appears at the right most edge of the panel identifying cast members and characters of the movie "Boyz n the Hood" and the user is only able to see a fraction of the associated image of the character "Doughboy."

Figure 4D:
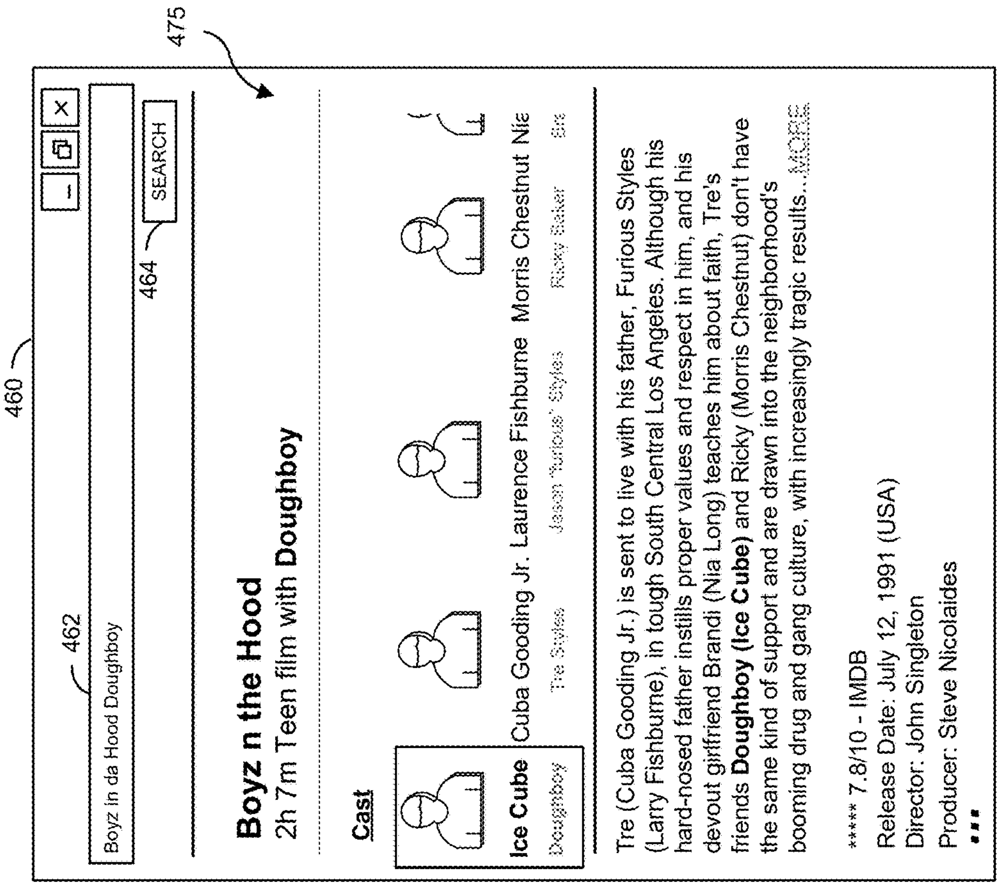

The user interface 460 depicted in FIG. 4D is another representative user interface for displaying knowledge panels in response to a query input by a user that includes additional context terms. In some implementations, the user interface 460 can be presented to a user in response to the user providing a query at a search engine or other system that enables users to provide requests for information. Briefly, the user interface 460 includes a query entry field 462, a query request control 464 and a knowledge panel 475.

The user interface 460 can be presented in response to a query input by a user. For example, as shown in FIG. 4D, a user has input the query "Boyz in da Hood Doughboy" at the query entry field 462, and the user interface 460 can be presented to the user in response to the user selecting the query request control 464. In this example, the information included in the knowledge panel 475 has been selected for inclusion in the knowledge panel 475 based on identifying the movie "Boyz n the Hood," as in FIG. 4C, and based on identifying the context term "Doughboy" that is associated with the movie "Boyz n the Hood" referenced by the query input.

The user interface 460 presented in response to the user-input query can include a knowledge panel 475 that presents information relating to the movie "Boyz n the Hood." As shown, the knowledge panel 410 identifies the title of the movie "Boyz n the Hood," the length of the duration of the movie, e.g., 2 h 7 m, a short summary of the movie based on the context term "Doughboy," e.g., "Teen film with Doughboy," a panel identifying cast members, e.g., "Ice Cube," "Cuba Gooding Jr.," "Laurence Fishburne" and "Morris Chestnut," where the user has the option to view more of the panel by scrolling to the right, a synopsis of the movie describing how "Tre (Cuba Gooding Jr.) is sent to live with his father, Furious Styles (Larry Fishburne), in tough South Central Los Angeles . . . ," where the user has the option to view more of the synopsis, and a list of facts about the movie, e.g., "IMDB" rating, release date, director, producer, and includes In this example, the user-input query includes an additional context term "Doughboy." In relation to the search query input by the user in FIG. 4C, the user interface 460 presented in response to the user-input query "Boyz in da Hood Doughboy" has contextualized the knowledge panel 475 to reflect the interests and intention of the user.

In some implementations, the order in which different fields in the knowledge panel are displayed may vary based on the additional context term referenced by the user-input query. For example, the displayed order of different fields in the knowledge panel 475 have been changed, such that the panel identifying cast members and characters of the movie "Boyz n the Hood" appears closer to the top of the knowledge panel 475, above other facts related to the movie, e.g., the synopsis of the movie. In addition, the displayed order of entries within the panel identifying cast members and characters of the movie is changed, such that the cast member who plays the character "Doughboy" appears in a more prominent position, e.g., the leftmost position of the panel.

In some implementations, different fields in the knowledge panel 475 that include text may be changed such that occurrences of the identified context term or terms related to the identified context terms input by the user are highlighted, appear in bold or italic font or otherwise emphasized using a visual element. For example, each instance of the term "Doughboy" or the related name "Ice Cube" may be highlighted through the use of bold font, as shown in FIG. 4D. Other words or terms may also be emphasized through the use of highlighting or bold font. For example, if the query term is a substring of a word appearing in the knowledge panel 475, the query term substring may be emphasized appropriately. In other examples, a synonym of the query term may be emphasized. Further examples include emphasizing joined compound words or fuzzy matched words relating to the search query. In addition, different fields in the knowledge panel can be emphasized through the use of a bounding box, such as the cast member entry for the actor "Ice Cube" who plays the character "Doughboy" in the movie, as shown in FIG. 4D.

In some implementations, the titles or subtitles that appear in the knowledge panel 475 may be altered based on the additional context term referenced by the user-input query. For example, the subtitle describing the genre of the movie "Teen film/Coming of age" in FIG. 4C may be changed to "Teen film with Doughboy" in FIG. 4D. In some implementations, the search query input by the user may reference an alias, and the knowledge panel can provide titles and text that instead use the referenced alias.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:

receiving, from a user interface, a search query that includes an entity and a context term related to the entity;

determining an element type based on a relationship between by matching a type associated with the entity and to a semantic attribute of the context term;

identifying a plurality of knowledge elements having content that is associated with the entity, the plurality of knowledge elements having respective associated rank scores based at least in part on a relationship between the respective content and the entity;

identifying a set of knowledge elements from the plurality of knowledge elements by matching the element type to a respective metadata attribute of each knowledge element in the set;

determining, for each knowledge element in the set, a strength of a relation between a portion of the respective content and the context term based at least in part on a positional relationship of the portion of the respective content to the entity within the respective content;

adjusting the respective associated rank scores for the set based at least in part on the respective strength of the relation;

selecting a knowledge element from the plurality of knowledge elements according to the respective adjusted rank score; and providing, to the user interface and in response to the search query, the selected knowledge element for display.

2. The computer-implemented method of claim 1, wherein the search query includes a plurality of context terms, and the plurality of context terms includes the context term related to the entity, the computer-implemented method further comprising:

processing the search query to identify the plurality of context terms, and comparing each context term of the plurality of context terms to a set of known context terms that are related to the entity to identify the context term related to the entity as related to the entity.

3. The computer-implemented method of claim 1, further comprising:

before selecting the knowledge element, further adjusting the respective rank scores of the plurality of knowledge elements based on a respective generation date.

4. The computer-implemented method of claim 1, further comprising:

before selecting the knowledge element, further adjusting the respective rank scores of the plurality of knowledge elements based on a user profile.

5. The computer-implemented method of claim 1, further comprising:

determining an entity identifier and a context term identifier that uniquely identifies the entity and the context term respectively, wherein the plurality of knowledge elements are identified based on the entity identifier and the context term identifier.

6. The computer-implemented method of claim 1, wherein the plurality of knowledge elements are associated with a plurality of different element types, and wherein selecting the knowledge element comprises selecting a knowledge element associated with an element type that corresponds to the context term.

7. The computer-implemented method of claim 1, wherein selecting the knowledge element is further according to a rank score threshold.

8. The computer-implemented method of claim 1, wherein providing the selected knowledge element includes providing a knowledge panel including the selected knowledge element in a search results page.

9. The computer-implemented method of claim 8, further comprising altering an appearance of the portion of the content included in the selected knowledge element, the portion of the content having a relation to the context term.

10. The computer-implemented method of claim 9, wherein altering the appearance includes changing a font or a background color of the portion of the content.

11. The computer-implemented method of claim 10, wherein changing the font includes bolding the portion of the content.

12. The computer-implemented method of claim 9, wherein the selected knowledge element includes an element type description, and wherein altering the appearance includes inserting the context term into the element type description.

13. The computer-implemented method of claim 9, wherein the selected knowledge element includes a list of items, and wherein altering the appearance includes repositioning an item in the list that is related to the context term to a more prominent position in the list.

14. A non-transitory computer-readable medium storing instructions that, when executed by an electronic processor, cause the electronic processor to:

receive, from a user interface, a search query that includes an entity and a context term related to the entity;

determine an element type based on a relationship between by matching a type associated with the entity and to a semantic attribute of the context term;

identify a plurality of knowledge elements having content that is associated with the entity, the plurality of knowledge elements having respective associated rank scores based at least in part on a relationship between the respective content and the entity;

identify a set of knowledge elements from the plurality of knowledge elements by matching the element type to a respective metadata attribute of each knowledge element in the set;

determine, for each knowledge element in the set, a strength of a relation between a portion of the respective content and the context term based at least in part on a positional relationship of the portion of the respective content to the entity within the respective content;

adjust the respective associated rank scores for the set based at least in part on the respective strength of the relation;

select a knowledge element from the plurality of knowledge elements according to the respective adjusted rank score; and provide, to the user interface and in response to the search query, the selected knowledge element for display.

15. The non-transitory computer-readable medium of claim 14, wherein the search query includes a plurality of context terms, the plurality of context terms includes the context term related to the entity, and the instructions further cause the electronic processor to:

process the search query to identify the plurality of context terms, and compare each context term of the plurality of context terms to a set of known context terms that are related to the entity to identify the context term related to the entity as related to the entity.

16. A system comprising:

an electronic processor; and a memory communicably coupled to the electronic processor and storing instructions that, when executed by the electronic processor, cause the system to:

receive, from a user interface, a search query that includes an entity and a context term related to the entity;

determine an element type based on a relationship between by matching a type associated with the entity and to a semantic attribute of the context term;

identify a plurality of knowledge elements having content that is associated with the entity, the plurality of knowledge elements having respective associated rank scores based at least in part on a relationship between the respective content and the entity;

identify a set of knowledge elements from the plurality of knowledge elements by matching the element type to a respective metadata attribute of each knowledge element in the set;

determine, for each knowledge element in the set, a strength of a relation between a portion of the respective content and the context term based at least in part on a positional relationship of the portion of the respective content to the entity within the respective content;

adjust the respective associated rank scores for the set based at least in part on the respective strength of the relation;

select a knowledge element from the plurality of knowledge elements according to the respective adjusted rank score; and provide, to the user interface and in response to the search query, the selected knowledge element for display.

17. The system of claim 16, wherein the search query includes a plurality of context terms, the plurality of context terms includes the context term related to the entity, the instructions further cause the electronic processor to:

process the search query to identify the plurality of context terms, and compare each context term of the plurality of context terms to a set of known context terms that are related to the entity to identify the context term related to the entity as related to the entity.

18. The system of claim 16, wherein the instructions further cause the electronic processor to, before selecting the knowledge element, further adjust the respective rank scores of the plurality of knowledge elements based on a respective generation date or a user profile.

19. The system of claim 16, wherein the instructions further cause the electronic processor to determine an entity identifier and a context term identifier that uniquely identifies the entity and the context term respectively, and the plurality of knowledge elements are identified based on the entity identifier and the context term identifier.

* * * * *